United States Patent
Bouriquet et al.

(10) Patent No.: US 10,995,782 B2
(45) Date of Patent: May 4, 2021

(54) METHOD FOR ASSEMBLING AT LEAST TWO PARTS BY MEANS OF MAIN AND SECONDARY DEFINITIVE CONNECTIONS AND ASSEMBLY OBTAINED USING THIS METHOD

(71) Applicants: Airbus Operations S.A.S., Toulouse (FR); Airbus Operations GmbH, Hamburg (DE)

(72) Inventors: Jacques Bouriquet, Toulouse (FR); Cristobal Brito Maur, Hamburg (DE)

(73) Assignees: Airbus Operations S.A.S.; Airbus Operations GmbH

( * ) Notice: Subject to any disclaimer, the term of this patent is extended or adjusted under 35 U.S.C. 154(b) by 0 days.

(21) Appl. No.: 16/697,730

(22) Filed: Nov. 27, 2019

(65) Prior Publication Data

US 2020/0191182 A1   Jun. 18, 2020

(30) Foreign Application Priority Data

Dec. 14, 2018   (FR) ...................... 18 72963

(51) Int. Cl.

| | |
|---|---|
| *F16B 5/02* | (2006.01) |
| *B23P 19/12* | (2006.01) |
| *B21D 39/00* | (2006.01) |
| *F16B 5/04* | (2006.01) |
| *B21J 15/14* | (2006.01) |
| *B21J 15/02* | (2006.01) |

(52) U.S. Cl.
CPC ............. *F16B 5/025* (2013.01); *B21D 39/00* (2013.01); *B23P 19/12* (2013.01); *B21J 15/02* (2013.01); *B21J 15/142* (2013.01); *F16B 5/04* (2013.01); *Y10T 29/49895* (2015.01); *Y10T 29/49943* (2015.01); *Y10T 29/49948* (2015.01); *Y10T 29/49956* (2015.01); *Y10T 29/49963* (2015.01)

(58) Field of Classification Search
CPC ...... F16B 5/025; F16B 5/04; Y10T 29/49895; Y10T 29/49943; Y10T 29/49948; Y10T 29/49956; Y10T 29/49963; B21J 15/142; B21J 15/02; B23P 19/12; B21D 39/00
See application file for complete search history.

(56) References Cited

U.S. PATENT DOCUMENTS

| | | |
|---|---|---|
| 5,050,288 A | 9/1991 | Woods |
| 8,209,865 B2 * | 7/2012 | Kelley .................. F16B 19/109 29/897.2 |
| 8,272,118 B2 | 9/2012 | Alvez |
| 2010/0308171 A1 | 12/2010 | Kelley et al. |
| 2014/0173879 A1 | 6/2014 | Negroni et al. |

* cited by examiner

*Primary Examiner* — Jermie E Cozart
(74) *Attorney, Agent, or Firm* — Lerner, David, Littenberg, Krumholz & Mentlik, LLP

(57) ABSTRACT

A method for assembling at least two parts, connected by main and secondary definitive connections arranged in predetermined positions, includes: secondary definitive connections each housed in secondary definitive holes passing through the parts to be assembled, made independently of one another before the parts are assembled, main definitive connections each housed in main definitive holes passing through the parts to be assembled, made during the same operation while the parts are held in place by the secondary definitive connections.

8 Claims, 2 Drawing Sheets

METHOD FOR ASSEMBLING AT LEAST TWO PARTS BY MEANS OF MAIN AND SECONDARY DEFINITIVE CONNECTIONS AND ASSEMBLY OBTAINED USING THIS METHOD

FIELD OF THE INVENTION

The present application relates to a method for assembling at least two parts by means of main and secondary definitive connections, and to an assembly obtained using this method.

BACKGROUND OF THE INVENTION

FIG. 4 shows an assembly 10 of two parts 12.1, 12.2 connected by a plurality of definitive connections 14 each housed in first and second coaxial definitive holes 16.1, 16.2 passing through the first and second parts 12.1, 12.2, respectively.

Each definitive connection 14 has a diameter D0 substantially equal to (fitting clearance aside) the diameter of the first and second definitive holes 16.1, 16.2.

In accordance with known practice as shown in FIGS. 1 to 5, before the definitive connections 14 are put in place, the first and second parts 12.1, 12.2 are held in place in an assembly position by means of the temporary connections 18, also referred to as pins, as shown in FIG. 2.

For each of these temporary connections 18, the first and second parts 12.1, 12.2 comprise pre-holes 20.1, 20.2 the diameters d0 of which are smaller than the diameter of a definitive connection 14. As shown in FIG. 1, these pre-holes 20.1, 20.2 are made independently of one another before the first and second parts 12.1, 12.2 are assembled. These pre-holes 20.1 and 20.2 are positioned at certain positions of the definitive connections 14.

The number and the distribution of the temporary connections 18 are determined in such a way that the first and second parts 12.1, 12.2 do not become deformed and remain pressed closely against one another while the definitive connections 14 are being put in place. As shown in FIG. 5, the number of temporary connections 18 represents between 10 and 30% of the total number of definitive connections 14.

After the temporary connections 18 have been put in place, the definitive connections 14 are put in place starting with those closest to the temporary connections 18 and moving gradually further away.

For each definitive connection 14, the definitive holes 16.1, 16.2 are made during the same drilling operation. Thus, the definitive holes 16.1, 16.2 of each definitive connection 14 are perfectly coaxial and have the same diameter. After the drilling step, the definitive connection 14 is put in place in the definitive holes 16.1, 16.2, as shown in FIG. 3. The steps of drilling and putting in place are performed successively for each of the definitive connections 14.

When all of the definitive connections 14 have been put in place between the temporary connections 18, the latter are removed. The pre-holes 20.1, 20.2 are then drilled out to the diameter D0 of the definitive holes 16.1, 16.2 and then the final definitive connections 14 are put in place.

The steps of putting in place and removing the temporary connections 18, and of drilling the pre-holes 16.1, 16.2 out to the diameter of the definitive holes 16.1, 16.2, are relatively time-consuming, which tends to increase the cost of assembly.

BRIEF SUMMARY OF THE INVENTION

Aspects of the present invention may overcome all or some of the disadvantages of the prior art.

An aspect of the invention relates to a method for assembling at least two parts, connected by definitive connections arranged in predetermined positions, characterized in that it comprises:
 a step of positioning the parts to be assembled,
 a step of putting in place secondary definitive connections that are each positioned in a location corresponding to one of the predetermined positions, each of said definitive connections being housed in secondary definitive holes passing through the parts to be assembled, made independently of one another before the parts are assembled, the number of secondary definitive connections and the locations thereof being determined in such a way that the parts to be assembled do not become deformed and remain pressed against one another during assembly,
 a step of putting in place main definitive connections that are each positioned in a location corresponding to one of the predetermined positions not occupied by one of the secondary definitive connections, in such a way that all of the determined positions are occupied by a main definitive connection or a secondary definitive connection, each of the main definitive connections being housed in main definitive holes passing through the parts to be assembled, made during the same operation while the parts are held in place by the secondary definitive connections.

The method according to an aspect of the invention dispenses with the steps of putting in place and removal of the temporary connections, and of re-machining of the pre-holes, thereby reducing the time taken for and the costs of assembly.

According to another feature, each main definitive connection comprises a shaft with a diameter determined as a function of the diameters of the main definitive holes in such a way as to obtain fitting with a clearance, with an undefined clearance or with interference between the shaft of the main definitive connection and the main definitive holes. In addition, each secondary definitive connection comprises a shaft with a diameter which is smaller than the diameters of the secondary definitive holes in such a way as to create a clearance between the shaft of the secondary definitive connection and the secondary definitive holes to allow insertion of each secondary definitive connection in the secondary definitive holes even if they are not perfectly aligned.

According to another feature, for at least one of the secondary definitive connections, the diameters of the secondary definitive holes are equal to the diameters of the main definitive holes and the shaft of the secondary definitive connection has a diameter which is smaller than the diameter of the shafts of the main definitive connections.

According to another feature, for at least one of the secondary definitive connections, the shaft of the secondary definitive connection has a diameter equal to or greater than the diameter of the shafts of the main definitive connections and the diameters of the secondary definitive holes are greater than the diameters of the main definitive holes.

According to another feature, for at least one of the secondary definitive connections, at least one of the secondary definitive holes has an open end shaped to match the shape of the secondary definitive connection.

According to another feature, at least one of the secondary definitive connections is a screwed connection with a view to gradually tightening the various secondary definitive connections so as to gradually correct the alignment of the secondary definitive holes.

According to another feature, the secondary definitive connections are positioned in at least one installation zone corresponding to a zone where the assembly is subjected to lower stresses.

According to another feature, at least one of the parts is reinforced in the vicinity of at least one secondary definitive connection.

According to another feature, for at least one secondary definitive connection, a spacing between the secondary definitive connection and an adjacent main definitive connection is smaller than a spacing between two adjacent main definitive connections.

The invention also relates to an assembly of at least two parts obtained using the assembly method according to one of the above features.

BRIEF DESCRIPTION OF THE DRAWINGS

Further features and advantages will emerge from the following description of the invention, which is provided merely by way of example, with reference to the appended drawings in which.

DETAILED DESCRIPTION

Figure 1:
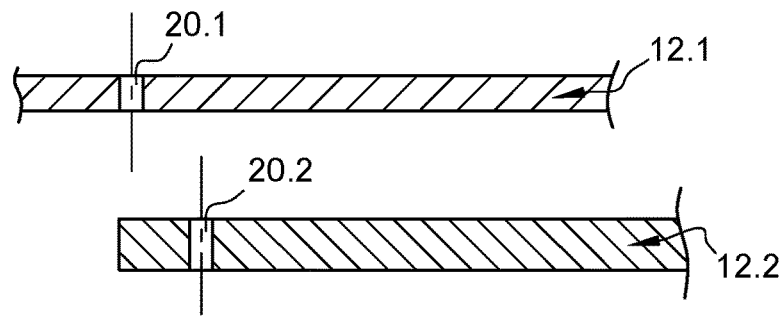
FIG. 1 is a view in section of two parts before they are assembled, showing embodiment configuration of the prior art.
Figure 2:
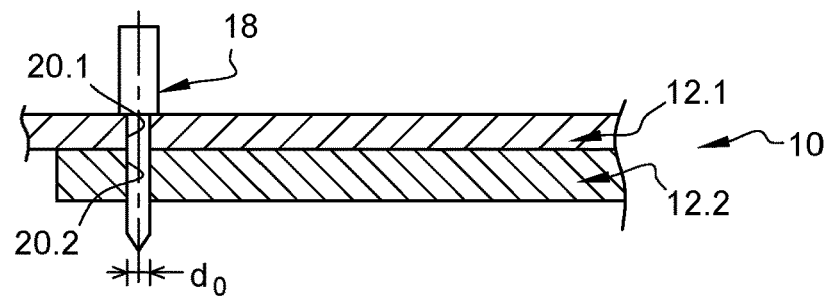
FIG. 2 is a view in section of the two parts, visible in FIG. 1, connected by a temporary connection, showing embodiment configuration of the prior art.
Figure 3:
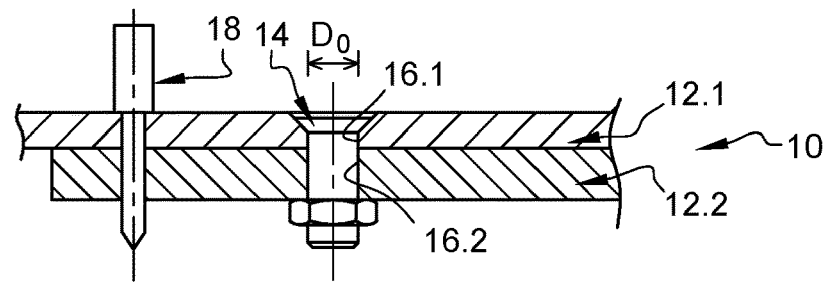
FIG. 3 is a view in section of the two parts, visible in FIG. 1, connected by a temporary connection and a definitive connection, showing embodiment configuration of the prior art.
Figure 4:
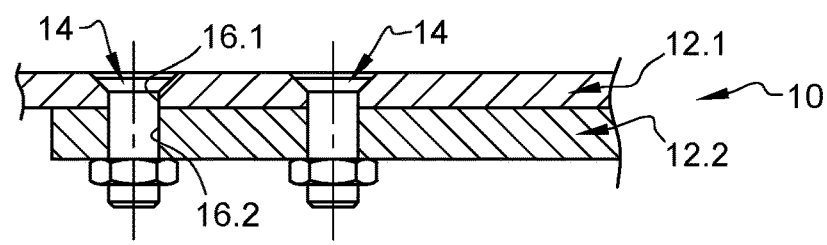
FIG. 4 is a view in section of the two parts, visible in FIG. 1, connected by definitive connections, showing embodiment configuration of the prior art.
Figure 5:
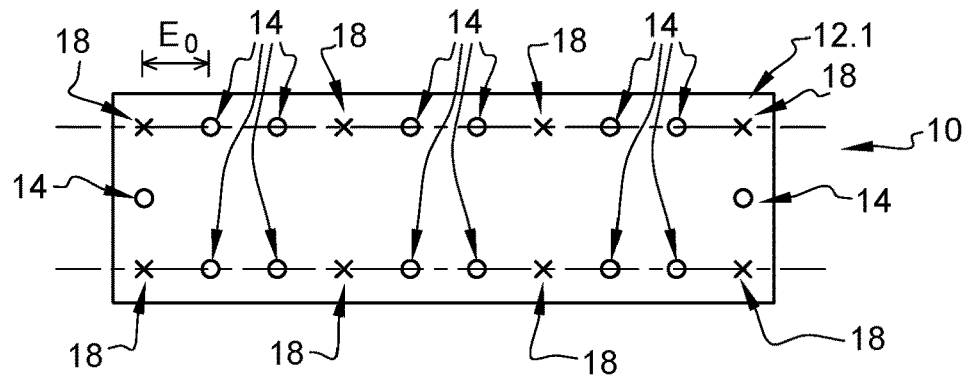
FIG. 5 is a side view of an assembly of two parts connected by definitive connections and temporary connections, showing embodiment configuration of the prior art.
Figure 6:
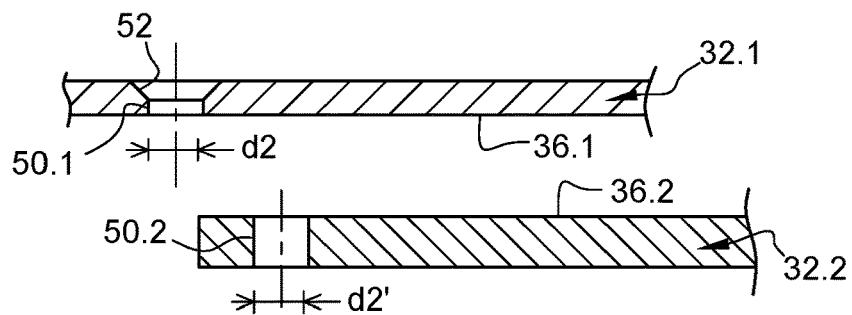
FIG. 6 is a view in section of two parts before they are assembled, showing an embodiment of the invention.

FIGS. 6 to 10 show an assembly 30 comprising at least two parts 32.1, 32.2 connected by a determined number of main and secondary definitive connections 34, 46 distributed in predetermined positions.

The first and second parts 32.1, 32.2 comprise first and second contact faces 36.1, 36.2 which are in contact with one another when the first and second parts 32.1, 32.2 are assembled.

Each main definitive connection 34 is a rivet, a crimped connection or a screwed connection and comprises a shaft 38 of diameter D1. For each main definitive connection 34, each part 32.1, 32.2 comprises a main definitive hole 40.1, 40.2. Thus, each main definitive connection 34 is housed in a first main definitive hole 40.1 made in the first part 32.1 and a second main definitive hole 40.2 made in the second part 32.2. These first and second main definitive holes 40.1, 40.2 are coaxial and have the same diameter. In one configuration, the diameter D1 of the shaft 38 of the main definitive connection 34 is determined as a function of the diameters d1 of the main definitive holes 40.1, 40.2 in such a way as to obtain fitting with a clearance, an undefined clearance or with interference between the shaft 38 and the main definitive holes 40.1, 40.2. This standard fitting clearance may be zero, negative or positive depending on the needs defined by a design team. In this case, the main definitive holes 40.1, 40.2 have a diameter d1 equal to the diameter D1 of the shaft 38 of the main definitive connection 34.

According to one configuration, each main definitive connection comprises a countersunk head 42 housed in a chamfer 44 provided at the first main definitive hole 40.1.

The parts 32.1, 32.2 and the main definitive connections 34 will not be described further here since they may be identical to those found in the prior art.

Figure 8:
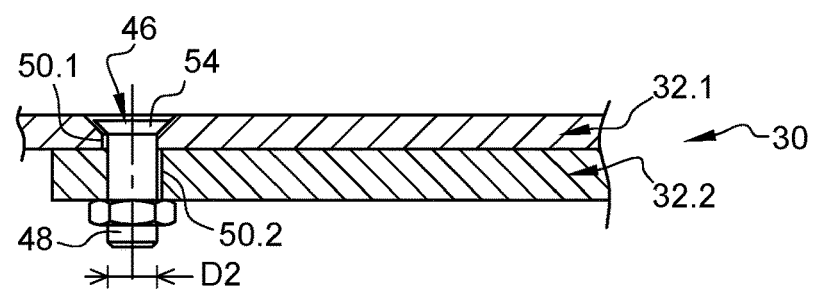
FIG. 8 is a view in section of the two parts, visible in FIG. 6, connected by a secondary definitive connection, showing an embodiment of the invention.

According to one embodiment, before the main definitive connections 34 are put in place, the first and second parts 32.1, 32.2 are held in place in an assembly position (corresponding to their positions after assembly) by means of the secondary definitive connections 46, as shown in FIG. 8, each positioned in a location corresponding to one of the predetermined positions. Each secondary definitive connection 46 has a shaft 48 of diameter D2. For each secondary definitive connection 46, each part 32.1, 32.2 comprises a secondary definitive hole 50.1, 50.2. Thus, the first part 32.1 comprises a first secondary definitive hole 50.1 and the second part 32.2 comprises a second secondary definitive hole 50.2.

Figure 7:
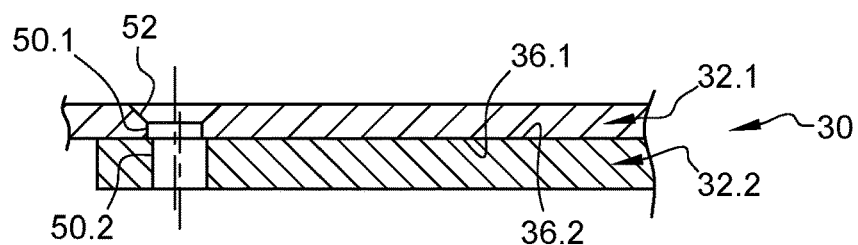
FIG. 7 is a view in section of the two parts, visible in FIG. 6, positioned one with respect to the other prior to a step of putting in place a secondary definitive connection, showing an embodiment of the invention.

According to one feature of the invention, the first and second secondary definitive holes 50.1, 50.2 have diameters d2, d2' which are almost identical. For each secondary definitive connection 46, the diameter D2 of the secondary definitive connection 46 is smaller than the diameters d2, d2' of the first and second secondary definitive holes 50.1, 50.2 so as to allow insertion of the secondary definitive connection 46 even if the first and second secondary definitive holes 50.1, 50.2 are not perfectly aligned, as shown in FIG. 7. Thus, the difference between the diameter D2 of the secondary definitive connection 46 and the diameters d2, d2' of the first and second secondary definitive holes 50.1, 50.2 is greater than the standard fitting clearance provided between the shafts 38 of the main definitive connections 34 and the main definitive holes 40.1, 40.2.

According to one embodiment, the first secondary definitive hole 50.1 has a diameter d2 equal to (manufacturing tolerances aside) the diameter d2' of the second secondary definitive hole 50.2.

According to a first configuration, for at least one of the secondary definitive connections, the diameters d2, d2' of the first and second secondary definitive holes 50.1, 50.2 are equal to (manufacturing tolerances aside) the diameters of the main definitive holes 40.1, 40.2. According to this first configuration, the shaft 48 of the secondary definitive connection 46 has a diameter which is smaller than the diameter of the shafts 38 of the main definitive connections 34.

According to a second configuration, for at least one of the secondary definitive connections 46, the shaft 48 of the secondary definitive connection 46 has a diameter equal or greater than the diameter of the shafts 38 of the main definitive connections 34 and the diameters d2, d2' of the first and second secondary definitive holes 50.1, 50.2 are greater than the diameters of the main definitive holes 40.1, 40.2.

For at least one of the secondary definitive connections 46, at least one of the first and second secondary definitive holes 50.1, 50.2 has an open end shaped to match the shape of the secondary definitive connection 46. Thus, according to one configuration visible in FIGS. 8 and 9, each first secondary definitive hole 50.1 has a chamfer 52 for receiving a countersunk head 54 of a secondary definitive connection 46.

As in the case of the temporary connections of the prior art, the number of secondary definitive connections 46 and the locations thereof are determined in such a way that the first and second parts 32.1, 32.2 do not become deformed and remain pressed closely against one another while the main definitive connections 34 are being put in place. The number of secondary definitive connections 46 is between 10 and 30% of the total number of main and secondary definitive connections 34, 46.

The secondary definitive connections 46 are also positioned according to the need to hold in place additional parts, such as local reinforcements.

According to one feature of the invention, at least one of the secondary definitive connections 46 is a screwed connection. Thus, it is possible to gradually tighten the various secondary definitive connections 46 so as to correct the alignment of the first and second secondary definitive holes 50.1, 50.2. According to one embodiment, the secondary definitive connections 46 are screwed connections sold under the trade mark Hi-Lite.

The first and second secondary definitive holes 50.1, 50.2 may be misaligned and/or the clearance between the shafts 48 of the secondary definitive connections 46 and the first and second secondary definitive holes 50.1, 50.2 may be greater than the standard fitting clearance.

According to a first configuration, the secondary definitive connections 46 are positioned in at least one installation zone 56 corresponding to a zone where the assembly 30 is subjected to lower stresses.

According to a second configuration, the secondary definitive connections 46 are configured to compensate for the fact that the first and second secondary definitive holes 50.1, 50.2 may be misaligned and/or that the clearance between the shafts 48 of the secondary definitive connections 46 and the first and second secondary definitive holes 50.1, 50.2 may be greater than the standard fitting clearance. Thus, the secondary definitive connections 46 are screwed connections sold under the trade mark Hi-Lite and/or are made of titanium and/or have shafts 48 with a diameter greater than the diameter of the shafts 38 of the main definitive connections 34 so as to be able to increase the tightening torque.

According to a third configuration, at least one of the parts 32.1, 32.2 is reinforced in the vicinity of at least one secondary definitive connection 46 so as to compensate for the fact that the first and second secondary definitive holes 50.1, 50.2 may be misaligned and/or that the clearance between the shafts 48 of the secondary definitive connections 46 and the first and second secondary definitive holes 50.1, 50.2 may be greater than the standard fitting clearance.

According to a fourth configuration, for at least one secondary definitive connection 46, the spacing E1' between the secondary definitive connection 46 and an adjacent main definitive connection 34 is smaller than a spacing E1 between two adjacent main definitive connections 34 so as to compensate for the fact that the first and second secondary definitive holes 50.1, 50.2 may be misaligned and/or that the clearance between the shafts 48 of the secondary definitive connections 46 and the first and second secondary definitive holes 50.1, 50.2 may be greater than the standard fitting clearance.

These different configurations may be combined.

According to an aspect of the invention, the method for assembling at least two parts, connected by a determined number of main and secondary definitive connections 34, 46, arranged in predetermined positions, comprises a step of making the first secondary definitive holes 50.1 in the first part 32.1 independently of the second secondary definitive holes 50.2 in the second part 32.2 before the first and second parts 32.1, 32.2 are assembled, as shown in FIG. 1. Each of the first and second secondary definitive holes 50.1, 50.2 is positioned in one of the predetermined positions.

The first and second parts 32.1, 32.2 are positioned in such a way as to approximately align the first and second secondary definitive holes 50.1, 50.2 so as to allow insertion of the secondary definitive connections 46. The latter are gradually tightened so as to gradually align the first and second secondary definitive holes 50.1, 50.2. The secondary definitive connections 46 may then be definitively tightened. To reduce defects in alignment between the first and second secondary definitive holes 50.1, 50.2, the latter may be made with small dimensional tolerances.

Figure 9:
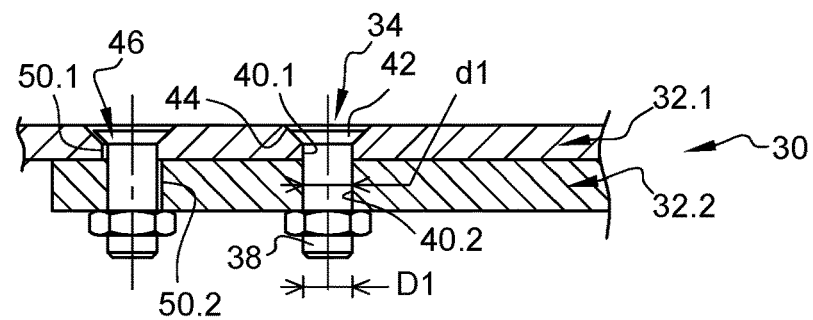
FIG. 9 is a view in section of the two parts, visible in FIG. 6, connected by a main definitive connection and a secondary definitive connection, showing an embodiment of the invention.
Figure 10:
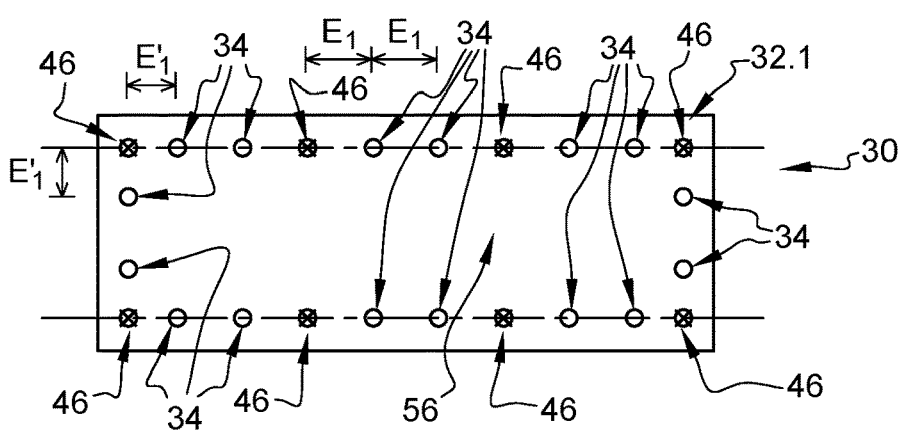
FIG. 10 is a side view of an assembly of two parts connected by main and secondary definitive connections, showing an embodiment of the invention.

As in the prior art, the main definitive connections 34 are each put in place in a location corresponding to one of the predetermined positions of the definitive connections not occupied by one of the secondary definitive connections, in such a way that all the determined positions of the definitive connections are occupied by a main definitive connection 34 or a secondary definitive connection 46. According to one aspect, the main definitive connections 34 are put in place starting with those closest to the secondary definitive connections 46 and moving gradually further away. For each main definitive connection 34, the main definitive holes 40.1, 40.2 are made during the same drilling operation while the parts 32.1, 32.2 are held in place by the secondary definitive connections 46. Thus, the first and second main definitive holes 40.1, 40.2 of each definitive connection 34 are perfectly coaxial and have the same diameter. After the drilling step, the main definitive connection 34 is put in place in the first and second main definitive holes 40.1, 40.2, as shown in FIG. 9. These steps of drilling and putting in place are performed successively for each of the main definitive connections 34.

The drilling step may be performed using a drilling template or a programmed robotic arm.

An aspect of the invention dispenses with the steps of putting in place and removal of the temporary connections, and of re-machining of the pre-holes, thereby reducing the time taken for and the costs of assembly.

According to another advantage, the secondary definitive connections 46 do not project with respect to the temporary connections of the prior art, thereby limiting the risks of collision with a drilling tool.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assembling at least two parts, connected by definitive connections arranged in predetermined positions, the method comprising:
   positioning the at least two parts to be assembled;
   putting in place secondary definitive connections that are each positioned in a location corresponding to one of the predetermined positions, each of said definitive connections being housed in secondary definitive holes passing through the at least two parts to be assembled, made independently of one another before the at least two parts are assembled, wherein the number of secondary definitive connections and the locations thereof is determined in such a way that the at least two parts to be assembled do not become deformed and remain pressed against one another during assembly; and
   putting in place main definitive connections that are each positioned in a location corresponding to one of the predetermined positions not occupied by one of the secondary definitive connections in such a way that all of the determined positions are occupied by a main definitive connection or a secondary definitive connection, wherein each of the main definitive connections is housed in main definitive holes passing through the parts to be assembled, made during the same operation while the at least two parts are held in place by the secondary definitive connections,
   wherein each main definitive connection comprises a shaft with a diameter determined as a function of the diameters of the main definitive holes in such a way as to obtain fitting with a clearance, with an undefined clearance or with interference between the shaft of the main definitive connection and the main definitive holes, and
   wherein each secondary definitive connection comprises a shaft with a diameter which is smaller than the diameters of the secondary definitive holes in such a way as to create a clearance between the shaft of the secondary definitive connection and the secondary definitive holes to allow insertion of each secondary definitive connection in the secondary definitive holes even if the secondary definitive holes are not perfectly aligned.

2. The assembly method according to claim 1, wherein, for at least one of the secondary definitive connections, the diameters of the secondary definitive holes are equal to the diameters of the main definitive holes, and
   wherein the shaft of the secondary definitive connection has a diameter which is smaller than the diameter of the shafts of the main definitive connections.

3. The assembly method according to claim 1, wherein, for at least one of the secondary definitive connections, the shaft of the secondary definitive connection has a diameter equal to or greater than the diameter of the shafts of the main definitive connections, and
   wherein the diameters of the secondary definitive holes are greater than the diameters of the main definitive holes.

4. The assembly method according to claim 1, wherein, for at least one of the secondary definitive connections, at least one of the secondary definitive holes has an open end shaped to match the shape of the secondary definitive connection.

5. The assembly method according to claim 1, wherein at least one of the at least two parts is reinforced in the vicinity of at least one secondary definitive connection.

6. A method for assembling at least two parts, connected by definitive connections arranged in predetermined positions, the method comprising:
   positioning the at least two parts to be assembled;
   putting in place secondary definitive connections that are each positioned in a location corresponding to one of the predetermined positions, each of said definitive connections being housed in secondary definitive holes passing through the at least two parts to be assembled, made independently of one another before the at least two parts are assembled, wherein the number of secondary definitive connections and the locations thereof is determined in such a way that the at least two parts to be assembled do not become deformed and remain pressed against one another during assembly; and
   putting in place main definitive connections that are each positioned in a location corresponding to one of the predetermined positions not occupied by one of the secondary definitive connections in such a way that all of the determined positions are occupied by a main definitive connection or a secondary definitive connection, wherein each of the main definitive connections is housed in main definitive holes passing through the parts to be assembled, made during the same operation while the at least two parts are held in place by the secondary definitive connections,
   wherein at least one of the secondary definitive connections is a screwed connection with a view to gradually tightening the various secondary definitive connections so as to gradually correct the alignment of the secondary definitive holes.

7. The assembly method according to claim 6, wherein the secondary definitive connections are positioned in at least one installation zone corresponding to a zone where the assembly is subjected to lower stresses.

8. A method for assembling at least two parts, connected by definitive connections arranged in predetermined positions, the method comprising:
   positioning the at least two parts to be assembled;
   putting in place secondary definitive connections that are each positioned in a location corresponding to one of the predetermined positions, each of said definitive connections being housed in secondary definitive holes passing through the at least two parts to be assembled, made independently of one another before the at least two parts are assembled, wherein the number of secondary definitive connections and the locations thereof is determined in such a way that the at least two parts to be assembled do not become deformed and remain pressed against one another during assembly; and
   putting in place main definitive connections that are each positioned in a location corresponding to one of the predetermined positions not occupied by one of the secondary definitive connections in such a way that all of the determined positions are occupied by a main definitive connection or a secondary definitive connection, wherein each of the main definitive connections is housed in main definitive holes passing through the parts to be assembled, made during the same operation while the at least two parts are held in place by the secondary definitive connections, wherein, for at least one secondary definitive connection, a spacing between the secondary definitive connection and an adjacent main definitive connection is smaller than a spacing between two adjacent main definitive connections.

\* \* \* \* \*